(12) United States Patent
Faruque et al.

(10) Patent No.: US 11,040,691 B2
(45) Date of Patent: Jun. 22, 2021

(54) VEHICLE AIRBAG

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 16/440,537

(22) Filed: Jun. 13, 2019

(65) Prior Publication Data

US 2020/0391690 A1    Dec. 17, 2020

(51) Int. Cl.
| | |
|---|---|
| *B60R 21/233* | (2006.01) |
| *B60R 21/207* | (2006.01) |
| *B60R 21/2338* | (2011.01) |
| *B60R 21/00* | (2006.01) |
| *B60R 21/235* | (2006.01) |
| *B60R 21/26* | (2011.01) |

(52) U.S. Cl.
CPC .......... *B60R 21/233* (2013.01); *B60R 21/207* (2013.01); *B60R 21/2338* (2013.01); *B60R 21/26* (2013.01); *B60R 2021/0032* (2013.01); *B60R 2021/23308* (2013.01); *B60R 2021/23386* (2013.01); *B60R 2021/23509* (2013.01)

(58) Field of Classification Search
CPC ................ B60R 21/233; B60R 21/207; B60R 21/23138
See application file for complete search history.

(56) References Cited

U.S. PATENT DOCUMENTS

| | | |
|---|---|---|
| 3,953,049 A | 4/1976 | Surace et al. |
| 9,533,651 B1 | 1/2017 | Ohno et al. |
| 9,573,553 B2 | 2/2017 | Ko et al. |
| 9,919,673 B2 | 3/2018 | Ohno et al. |
| 9,925,943 B2 | 3/2018 | Ohno et al. |
| 9,944,246 B2 | 4/2018 | Ohno et al. |
| 9,950,687 B2 | 4/2018 | Kato et al. |
| 10,005,417 B2 | 6/2018 | Ohno et al. |
| 10,071,702 B2 | 9/2018 | Ohno et al. |
| 10,112,570 B2 | 10/2018 | Barbat et al. |
| 10,625,704 B2 * | 4/2020 | Dry ...................... B60R 21/233 |
| 10,710,539 B2 * | 7/2020 | Cho ...................... B60R 21/207 |
| 10,875,488 B2 * | 12/2020 | Kanegae ............. B60R 21/2338 |
| 10,906,500 B2 * | 2/2021 | Kanegae ............... B60R 21/239 |
| 2013/0015642 A1 | 1/2013 | Islam et al. |
| 2017/0072889 A1 * | 3/2017 | Whitens .................. B60R 21/04 |
| 2017/0203711 A1 | 7/2017 | Ohno |

FOREIGN PATENT DOCUMENTS

DE           19859988 B4      6/2010

* cited by examiner

*Primary Examiner* — Nicole T Verley
(74) *Attorney, Agent, or Firm* — Frank A. MacKenzie; Bejin Bieneman PLC

(57) ABSTRACT

An assembly includes a seat back having a top end. The assembly includes an airbag supported by the seat back and inflatable to an inflated position including an inner panel and an outer panel defining an inflation chamber therebetween. The assembly includes a plurality of support tubes inflatable to inflated positions extending from the seat back along the outer panel, at least one of the support tubes in the inflated position extending from the top end of the seat back.

20 Claims, 6 Drawing Sheets

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
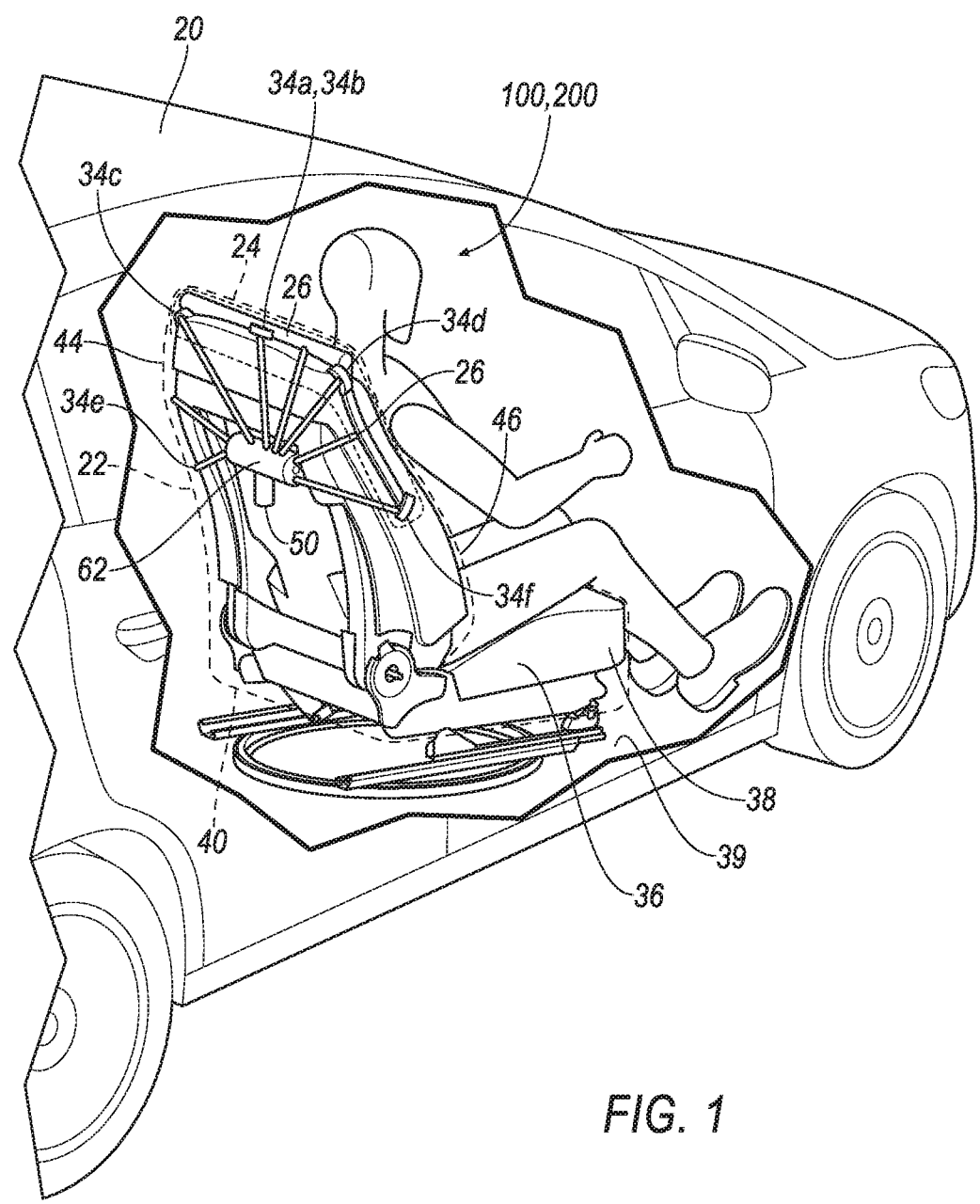
FIG. 1 is a perspective view of a vehicle having a seat with an airbag.

An assembly includes a seat back having a top end. The assembly includes an airbag supported by the seat back and inflatable to an inflated position including an inner panel and an outer panel defining an inflation chamber therebetween. The assembly includes a plurality of support tubes inflatable to inflated positions extending from the seat back along the outer panel, at least one of the support tubes in the inflated position extending from the top end of the seat back.

The plurality of support tubes may each extend to a distal end, the distal ends fixed to airbag.

The assembly may include an inflator in fluid communication with the airbag and the plurality of support tubes.

The seat back may include a first side and a second side spaced from the first side along a cross-seat axis, and the plurality of support tubes include a first support tube supported by the seat back at the top end between the first side and the second side, a second support tube supported by the seat back at the first side, and a third support tube support by the seat back at the second side.

The assembly may include a first fill tube in fluid communication with the first support tube, a second fill tube in fluid communication with the second support tube, and a third fill tube in fluid communication with the third support tube.

The first fill tube, the second fill tube, and the third fill tube may each define an inner diameter, the inner diameter of the first fill tube greater than the inner diameters of the second fill tube and the third fill tube.

The airbag in the inflated position may include a front edge, and the first support tube may extend from the seat back to a distal end, the distal end of the first support tube fixed to the airbag at the front edge.

The airbag in the inflated position may include an apex, and the first support tube may extend from the seat back to a distal end, the distal end of the first support tube fixed to the airbag at the apex.

The airbag in the inflated position may include a rear edge, and the assembly may include a tether connecting the seat back to the rear edge of the airbag.

At least one of the support tubes of the plurality of support tubes may include fabric that is stronger than a fabric of the airbag.

The airbag in the inflated position may be dome shaped.

An assembly includes a seat back having a top end, and a first side and a second side spaced from the first side along a cross-seat axis. The assembly includes an airbag supported by the seat back and inflatable to an inflated position, the airbag in the inflated position extending along and away from the top end, first side, and the second side of the seat back. The assembly includes an inflator supported by the seat back. The assembly includes a plurality of fill tubes in fluid communication with inflator and the airbag.

The assembly may include a manifold between and in fluid communication with the inflator and the fill tubes.

The assembly may include a support tube inflatable to an inflated position and a second fill tube in fluid communication with the inflator and the support tube.

The second fill tube may define an inner diameter that is greater than an inner diameter of each of the fill tubes of the plurality of the fill tubes in fluid communication with the airbag and the inflator.

The support tube in the inflated position may be outside of the airbag in the inflated position.

The airbag in the inflated position may be dome shaped.

The airbag in the inflated position may define an inflation chamber that is continuous from the first side of the seat back to the second side of the seat back.

The assembly may include a support tube inflatable to an inflated position defining an inflation chamber that is isolated from the inflation chamber of the airbag.

The assembly may include a floor, the seat back supported by and rotatable relative to the floor.

With reference to the Figures, wherein like numerals indicate like parts throughout the several views, an assembly 100, 200 for a vehicle 20 includes a seat back 22 having a top end 24. The assembly 100, 200 includes an airbag 26 supported by the seat back 22 and inflatable to an inflated position including an inner panel 28 and an outer panel 30 defining an inflation chamber 32 therebetween (illustrated in FIG. 4). The assembly 100, 200 includes a plurality of support tubes 34*a*, 34*b*, 34*c*, 34*d*, 34*e*, 34*f* inflatable to inflated positions extending from the seat back 22 along the outer panel 30, at least one of the support tubes 34*a*, 34*b*, 34*c*, 34*d* in the inflated position extending from the top end 24 of the seat back 22.

The assembly 100, 200 controls kinematics of an object in the vehicle 20. For example, the airbag 26 in the inflated position may control kinematics of a head and/or torso of an occupant of the vehicle 20. The support tubes 34*a*, 34*b*, 34*c*, 34*d*, 34*e*, 34*f* guide the airbag 26 as the support tubes 34*a*, 34*b*, 34*c*, 34*d*, 34*e*, 34*f* and the airbag 26 move to the inflated positions.

The vehicle 20, illustrated in FIG. 1, may be any type of passenger or commercial automobile such as a car, a truck, a sport utility vehicle, a crossover vehicle, a van, a minivan, a taxi, a bus, etc. The vehicle 20 includes a passenger cabin to house occupants, if any, of the vehicle 20. The passenger cabin includes one or more seats 36. The seats 36 may be supported by a floor 39 of the vehicle 20. The seats 36 may be rotatable relative to the floor 39, e.g., to permit rotation of the seat 36 to face a side of the vehicle 20, a rear of the vehicle 20, etc. For example, the seats 36 may each be supported via a base that includes portions that rotate relative to each other. One of the portions may be fixed to the floor 39 and the other of the portions may be fixed to the seat 36. The seat 36 shown in the Figures is a bucket seat, but alternatively the seat 36 may be a bench seat or another type of seat.

Each seat 36 defines a cross-seat axis A1, i.e., extending between a left side and a right side of the seat 36. Each seat 36 defines a seat-longitudinal axis A2, i.e., extending between a front and a rear of the seat 36. The cross-seat axis A1 and the seat-longitudinal axis A2 are perpendicular to each other. The front, rear, left and right sides, and relative directions used herein (such forward, rearward, upward, downward, inner, outer, highest, lowest, etc.) may be relative to an orientation of an occupant of the seat 36 seated on a seat bottom 38 of the seat 36 and reclining against the seat back 22.

The seat 36 may include the seat back 22, the seat bottom 38, and a head restraint. The head restraint may be supported by the seat back 22 and may be stationary or movable relative to the seat back 22. The seat back 22 may be supported by the seat bottom 38 and may be stationary or movable relative to the seat bottom 38. The seat bottom 38 extends from the seat back 22 along the seat-longitudinal axis A2. The seat back 22, the seat bottom 38, and/or the head restraint may be adjustable in multiple degrees of freedom. Specifically, the seat back 22, the seat bottom 38, and/or the head restraint may themselves be adjustable, in other words, adjustable components within the seat back 22, the seat bottom 38, and/or the head restraint, and/or may be adjustable relative to each other. For example, the seat back 22 may pivot relative to the seat bottom 38 along an axis that is elongated parallel to the cross-seat axis A1, e.g., to recline the seat 36.

The seat bottom 38 and/or the seat back 22 may include a frame and a covering supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The covering may include upholstery and padding. The upholstery may be formed of cloth, leather, faux leather, or any other suitable material. The upholstery may be stitched in panels around the frame. The padding may be between the covering and the frame, and may be foam or any other suitable material.

The seat back 22 has the top end 24 and a bottom end 40 spaced from the top end 24. The bottom end 40 of the seat back 22 is proximate the seat bottom 38, i.e., closer to the seat bottom 38 than the top end 24. The seat back 22 may be supported by the seat bottom 38 at the bottom end 40 of the seat back 22. The top end 24 is spaced from the seat bottom 38. The head restraint is supported at the top end 24 of the seat back 22.

The seat back 22 includes a first side 44 and a second side 46, e.g., a right side and a left side. The first side 44 and the second side 46 are spaced from each other along the cross-seat axis A1. The first side 44 and the second side 46 may extend from the bottom end 40 of the seat back 22 to the top end 24 of the seat back 22. The adjectives "first" and "second" are used throughout this document as identifiers and are not intended to signify importance or order.

The airbag 26 may be formed of a woven polymer or any other material. As one example, the airbag 26 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 26 may be supported by a housing 48. The housing 48 provides a reaction surface for the airbag 26 in the inflated position. The housing 48 may be supported by the seat 36, e.g., by the frame of the seat back 22. The housing 48 may extend along the top end 24 of the seat back 22 and along the first side 44 and the second side 46 of the seat back 22. The housing 48 may be formed of any suitable material, e.g., a rigid polymer, a metal, a composite, etc.

The airbag 26 is supported by the seat back 22, e.g., via the housing 48. The airbag 26 is inflatable from an uninflated position, shown in FIGS. 1 and 2. The airbag 26 in the uninflated position may be disposed in the housing 48. The airbag 26 in the uninflated position may extend along the top end 24 of the seat back 22 and along the first side 44 and the second side 46 of the seat back 22.

Figure 3:
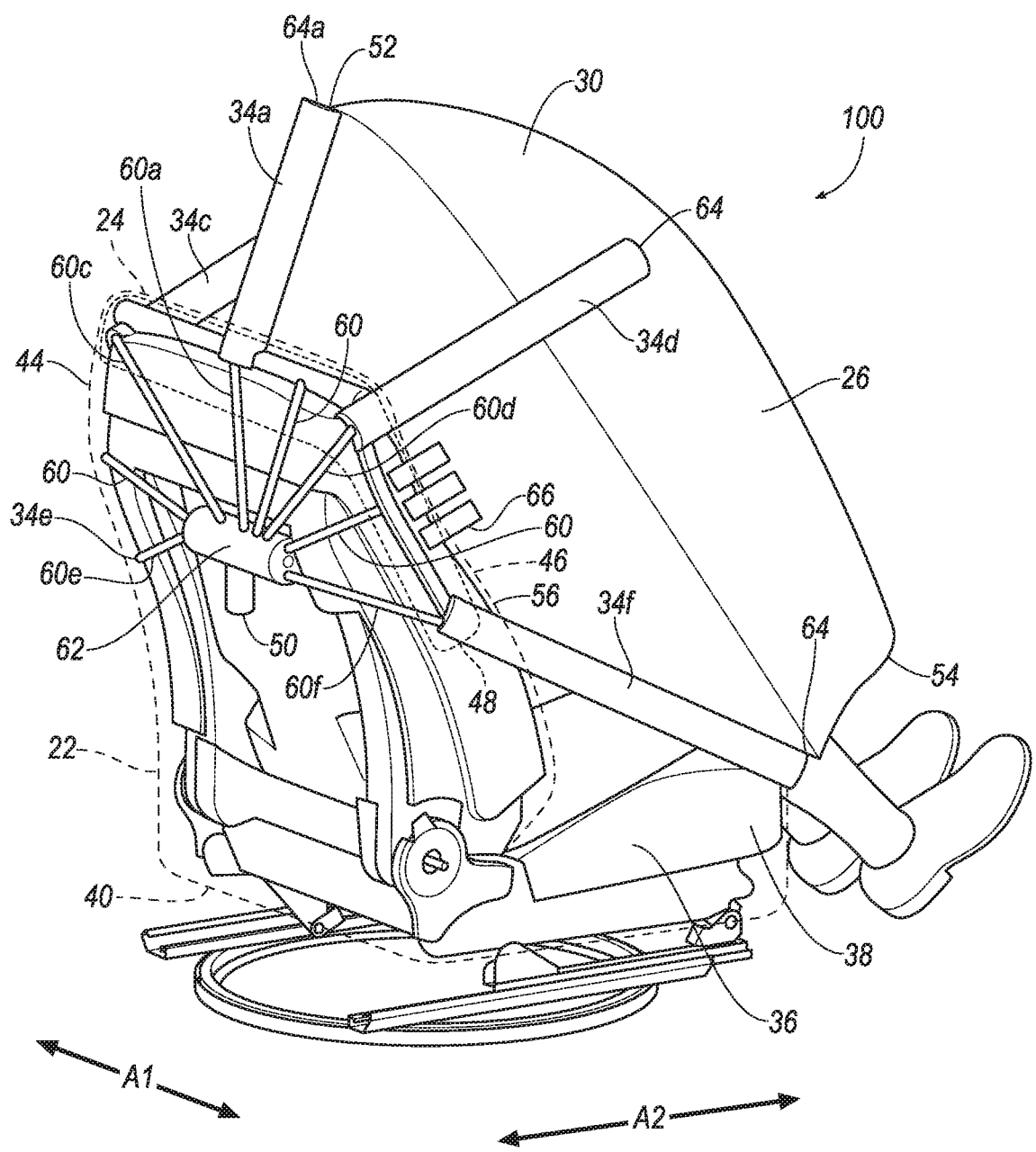
FIG. 3 is a perspective view of the seat with the airbag in an inflated position.
Figure 4:
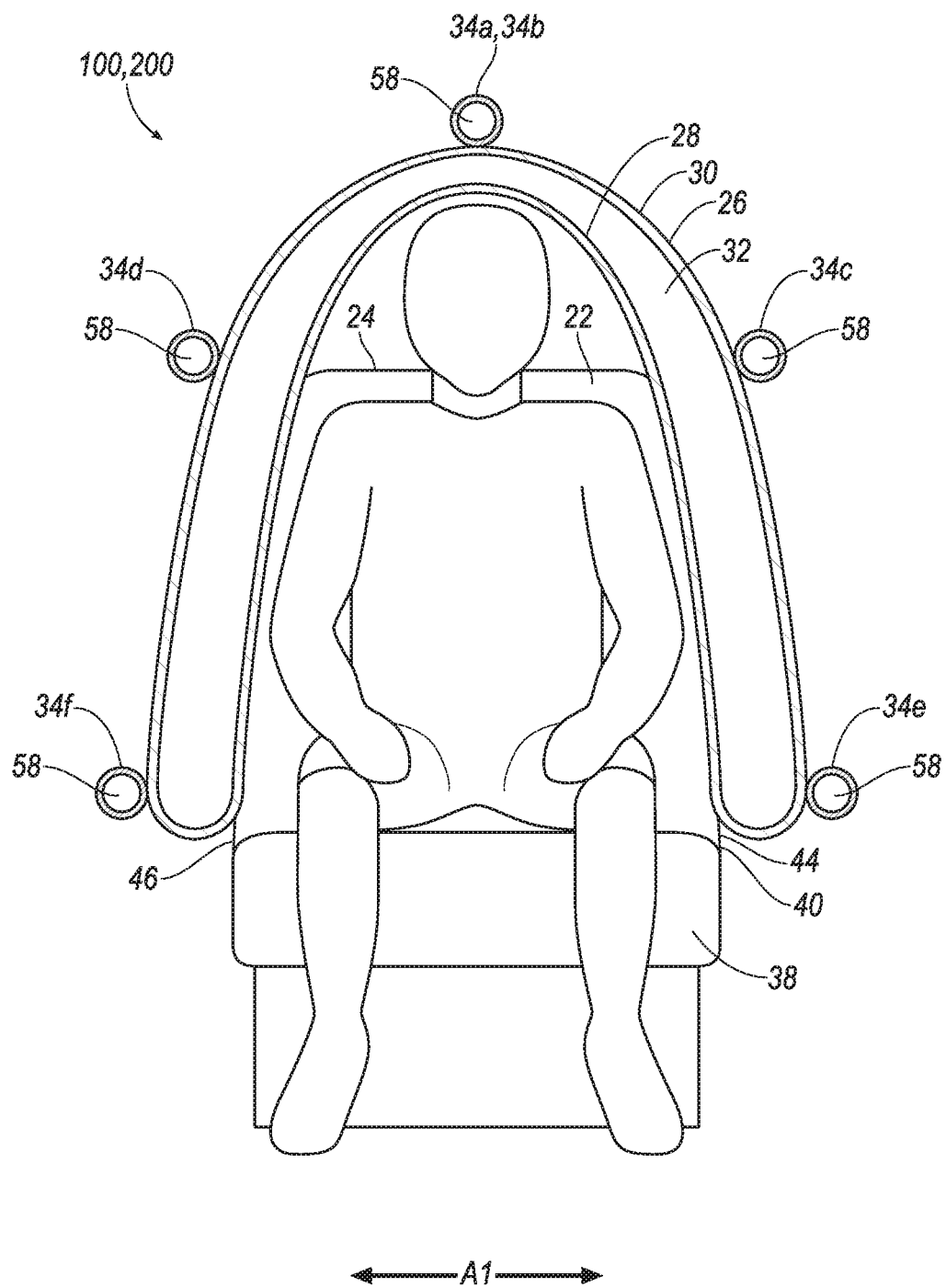
FIG. 4 is a front view of the seat with a cross section of the airbag in the inflated position.
Figure 5:
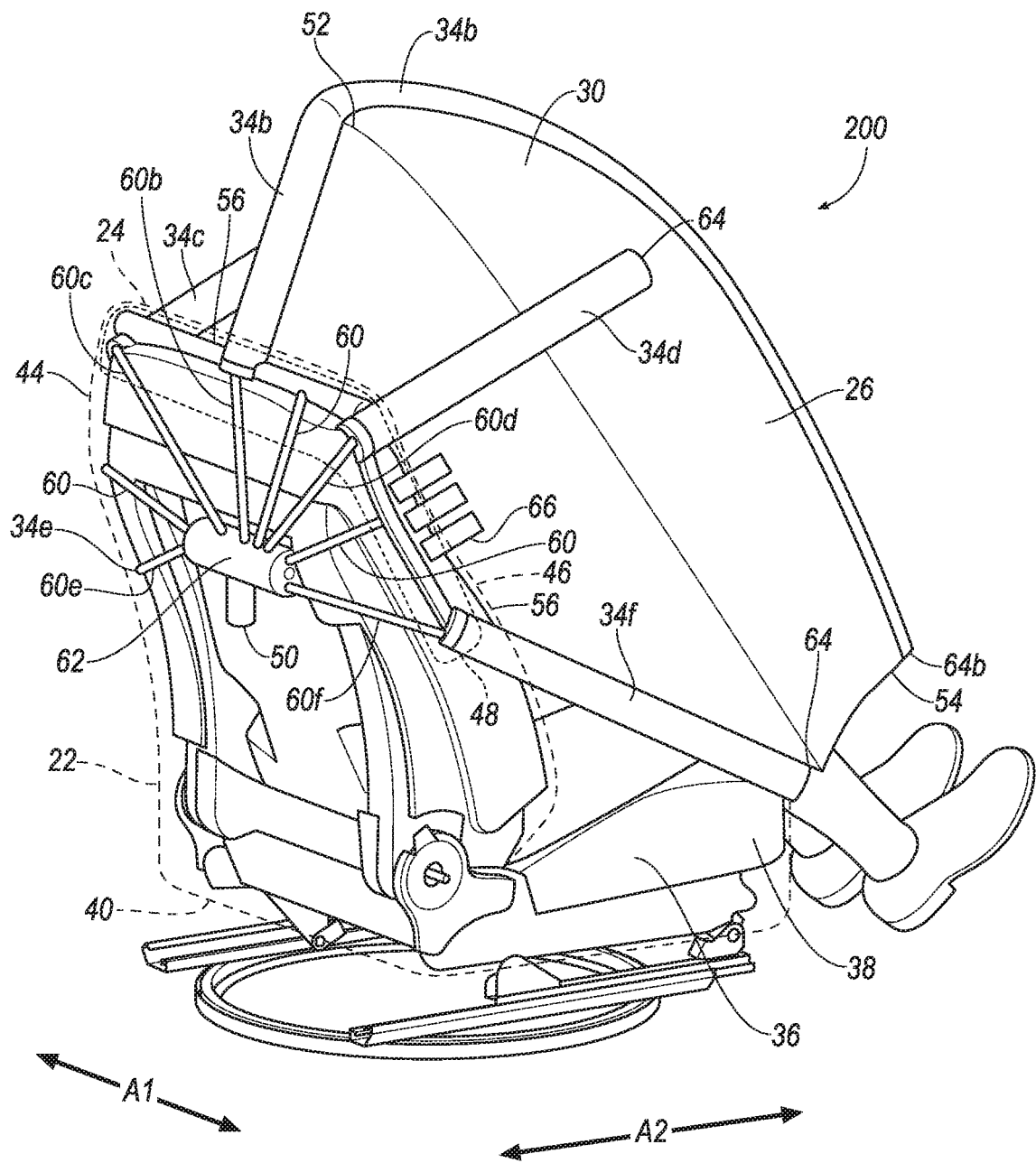
FIG. 5 is a perspective view of the seat with an airbag in an inflated position.

The airbag 26 is inflatable to the inflated position, shown in FIGS. 3-5. The airbag 26 in the inflated position includes the inner panel 28 and the outer panel 30. The inner panel 28 and the outer panel 30 may be sheets of fabric. The inner panel 28 may be fixed to the outer panel 30, e.g., via stitching, adhesive, friction weld, etc. The inner panel 28 and the outer panel 30 may be monolithic i.e., a one-piece unit without any fasteners, joints, welding, adhesives, etc., fixing the panels 28, 30 together. The inner panel 28 and the outer panel 30 define the inflation chamber 32 therebetween. The inflation chamber 32 is filled with inflation medium, e.g., from an inflator 50. The inflation chamber 32 may be continuous from the first side 44 of the seat back 22 to the second side 46 of the seat back 22. In other words, inflation medium in the inflation chamber 32 may freely flow from the from the first side 44 to the second side 46. For example, the airbag 26 may be free of panels, etc., separating the airbag 26 into multiple airbags, inflation chambers, etc.

The airbag 26 in the inflated position may be dome shaped. For example, the airbag 26 in the inflated position may include an apex 52, i.e., a highest point of the airbag 26. The airbag 26 may extend downward from the apex 52, e.g., to a front edge 54 and a rear edge 56 of the airbag 26 in the inflated position and along the first side 44 and the second side 46 of the seat back 22. In other words, the apex 52 may be between and above the front edge 54 and the rear edge 56 of the airbag 26. The dome shape of the airbag 26 permits the airbag 26 to surround a head and torso of an occupant of the seat 36.

The airbag 26 in the inflated position may extend along the top end 24, the first side 44, and the second side 46 of the seat back 22. For example, the rear edge 56 of the airbag 26 may extend upward along the first side 44, across the top end 24 to the second side 46, and down the second side 46 toward the bottom end 40. The airbag 26 in the inflated position may extend away from the top end 24, the first side 44, and the second side 46 of the seat back 22. For example, the airbag 26 may extent away from the rear edge 56 to the front edge 54. The front edge 54 may be below midway between the top end 24 and bottom end 40 of the seat back 22.

Figure 2:
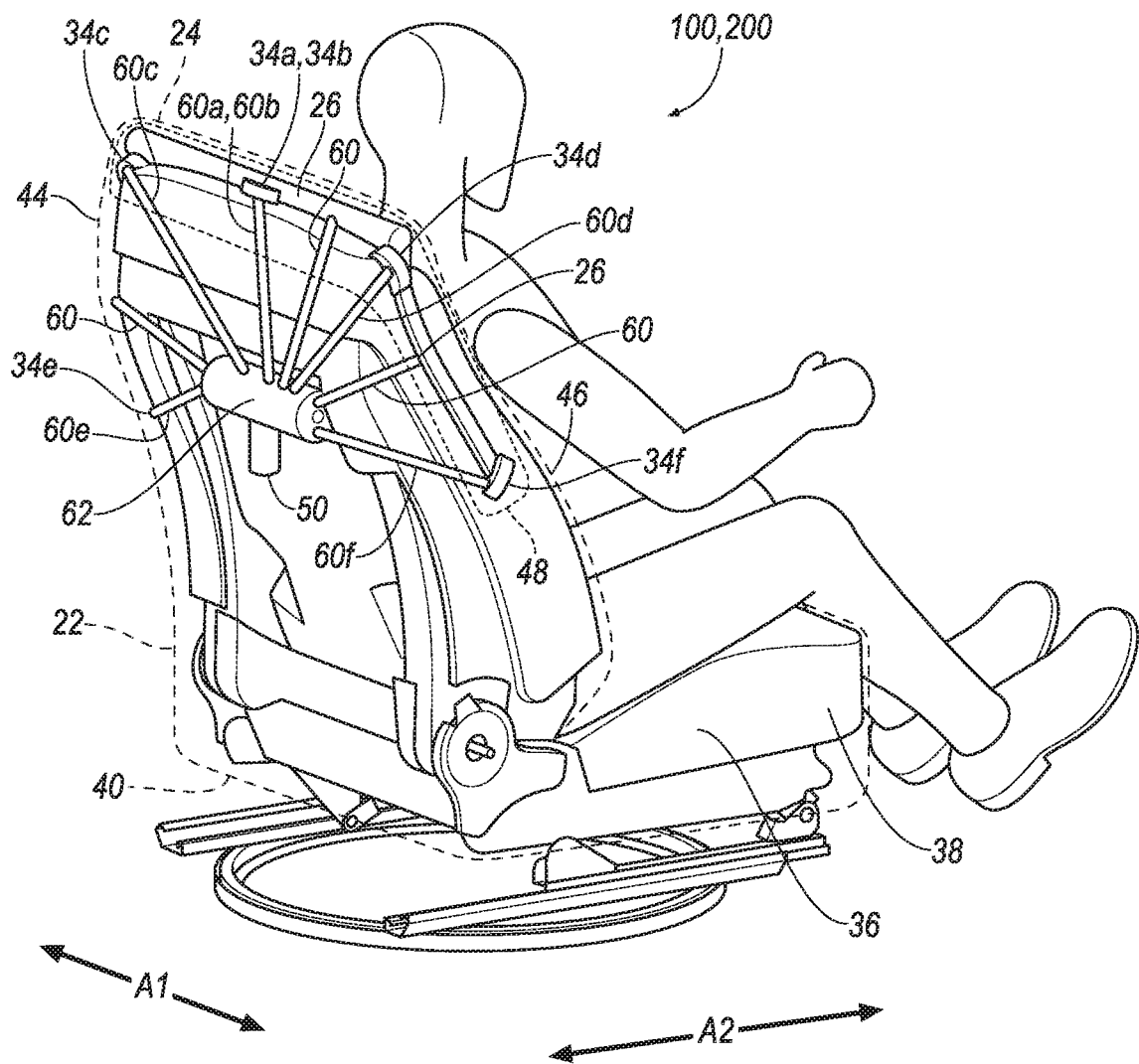
FIG. 2 is a perspective view of the seat with the airbag in an uninflated position.

The support tubes 34a, 34b, 34c, 34d, 34e, 34f are inflatable from uninflated positions, shown in FIGS. 1 and 2. The support tubes 34a, 34b, 34c, 34d, 34e, 34f are supported by the seat back 22, e.g., via the housing 48. The support tubes 34a, 34b, 34c, 34d, 34e, 34f may be fabric, e.g., as described for the airbag 26. One or more of the support tubes 34a, 34b, 34c, 34d, 34e, 34f may include fabric that is stronger than the fabric of the airbag 26, e.g., a higher tensile strength, a higher denier, etc. The increased strength of the fabric of the support tubes 34a, 34b, 34c, 34d, 34e, 34f provides an increased rigidity to the support tubes 34a, 34b, 34c, 34d, 34e, 34f in the inflated positions, e.g., to support the airbag 26 in the inflated position.

One of the support tubes 34a, 34b may be supported by the seat back 22 at the top end 24 between the first side 44 and the second side 46. For example, the support tube 34a, 34b may be supported at a middle of the top end 24 along the cross-seat axis A1. One of the support tubes 34c may be supported by the seat back 22 at the first side 44 and at the top end 24, e.g., where the top end 24 and the first side 44 intersect. One of the support tubes 34e may be supported by the seat back 22 at the first side 44 between the top end 24 and the bottom end 40, e.g., midway between the top end 24 and the bottom end 40. One of the support tubes 34d may be supported by the seat back 22 at the second side 46 and at the top end 24, e.g., where the top end 24 and the second side 46 intersect. One of the support tubes 34f may be supported by the seat back 22 at the second side 46 between the top end 24 and the bottom end 40, e.g., midway between the top end 24 and the bottom end 40.

The support tubes 34a, 34b, 34c, 34d, 34e, 34f are inflatable to inflated positions, shown in FIGS. 3-5. Each support tube 34a, 34b, 34c, 34d, 34e, 34f in the inflated position defines an inflation chamber 58 (illustrated in FIG. 4). The support tubes 34a, 34b, 34c, 34d, 34e, 34f in the inflated positions extend away from the seat back 22. For example, the support tubes 34a, 34b, 34c, 34d, at the top end 24 of the seat back 22 may extend forward and upward (e.g., away from the seat back 22 and the seat bottom 38) from the top end 24 of the seat back 22. As another example, the support tubes 34e, 34f supported at the first side 44 and the second side 46 between the top end 24 and the bottom end 40 may extend forward and downward (e.g., away from the seat back 22 and toward the seat bottom 38) from the first side 44 and the second side 46 of the seat back 22.

The support tubes 34a, 34b, 34c, 34d, 34e, 34f in the inflated positions extend from the seat back 22 along the outer panel 30 of the airbag 26. For example, the support tubes 34a, 34b, 34c, 34d, 34e, 34f may abut the outer panel 30. The support tubes 34a, 34b, 34c, 34d, 34e, 34f in the inflated positions are outside of the airbag 26 in the inflated position. In other words, the support tubes 34a, 34b, 34c, 34d, 34e, 34f may be outside the inflation chamber 32 of the airbag 26. For example, the outer panel 30 and the inflation chamber 32 of the airbag 26 may be between the inner panel 28 of the airbag 26 and the support tubes 34a, 34b, 34c, 34d, 34e, 34f.

The inflation chambers 58 of the support tubes 34a, 34b, 34c, 34d, 34e, 34f are isolated from the inflation chamber 32 of the airbag 26. In other words, inflation medium may be inhibited from flowing from the inflation chambers 58 of the support tubes 34a, 34b, 34c, 34d, 34e, 34f to the inflation chamber 32 of the airbag 26, and vice versa. For example, the airbag 26 and the support tubes 34a, 34b, 34c, 34d, 34e, 34f may be free of opening, passages, etc., providing fluid communication between the inflation chambers 58 of the support tubes 34a, 34b, 34c, 34d, 34e, 34f and the inflation chamber 32 of the airbag 26 (with the exception of fill tubes 60, 60a, 60b, 60c, 60d, 60e, 60f and a manifold 62, discussed below).

The support tubes 34a, 34b, 34c, 34d, 34e, 34f may each extend from the seat back 22 to a distal end 64, 64a, 64b. The distal ends 64, 64a, 64b may be fixed to airbag 26, e.g., to the outer panel 30 of the airbag 26. For example, and with reference to the assembly 100 shown in FIG. 3, the distal end 64a of the support tube 34a may be fixed to the airbag 26 at the apex 52. As another example, and with reference to the assembly 200 shown in FIG. 5, the distal end 64b of the support tube 34b may be fixed to the airbag 26 at the front edge 54. The distal ends 64, 64a, 64b may be fixed to airbag 26 via stitching, adhesive, friction welding, etc. The support tubes 34a, 34b, 34c, 34d, 34e, 34f may be fixed to the airbag 26, e.g., to the outer panel 30, between the seat back 22 and the distal ends 64, 64a, 64b, e.g., continuously, at intervals, etc.

The assembly 100, 200 may include a tether 66 connecting the seat back 22 to the rear edge 56 of the airbag 26. The tether 66 may be fabric, or any suitable material. The tether 66 secures and positions the airbag 26 in the inflated position. The tether 66 may be fixed to the seat back 22, e.g., at the first side 44 or the second side 46. The tether 66 may be fixed to the airbag 26 at the rear edge 56.

The assembly 100, 200 includes the inflator 50 for inflating the airbag 26 and the support tubes 34a, 34b, 34c, 34d, 34e, 34f to the inflated positions. The inflator 50 may be supported by the seat back 22. The inflator 50 is in fluid communication with the airbag 26 and the plurality of support tubes 34a, 34b, 34c, 34d, 34e, 34f, e.g., via the fill tubes 60, 60a, 60b, 60c, 60d, 60e, 60f and the manifold 62. The inflator 50 may inflate the airbag 26 and the support tubes 34a, 34b, 34c, 34d, 34e, 34f with an inflatable medium, such as a gas. The inflator 50 may be, for example, a pyrotechnic inflator that uses a chemical reaction to drive inflation medium to the airbag 26 and the support tubes 34a, 34b, 34c, 34d, 34e, 34f. The inflator 50 may be of any suitable type, for example, a cold-gas inflator.

The manifold 62 defines a chamber of sufficient volume such that generally constant fluid pressure is provided to the fill tubes 60, 60a, 60b, 60c, 60d, 60e, 60f despite variations in flow resistance and rate caused by the airbag 26 and support tubes 34a, 34b, 34c, 34d, 34e, 34f unrolling and/or unfolding during inflation, such that one fill tube 60, 60a, 60b, 60c, 60d, 60e, 60f is not provided with significantly higher or lower pressure than another fill tube 60, 60a, 60b, 60c, 60d, 60e, 60f, etc. The manifold 62 may be between the inflator 50 and the fill tubes 60, 60a, 60b, 60c, 60d, 60e, 60f. The manifold 62 may be in fluid communication with the inflator 50 and the fill tubes 60, 60a, 60b, 60c, 60d, 60e, 60f, e.g., to receive inflation medium from the inflator 50 and provide such inflation medium to the airbag 26 and support tubes 34a, 34b, 34c, 34d, 34e, 34f via the fill tubes 60, 60a, 60b, 60c, 60d, 60e, 60f.

The fill tubes 60, 60a, 60b, 60c, 60d, 60e, 60f are in fluid communication with inflator 50 (e.g., via the manifold 62) and the airbag 26. Inflation medium provided to the fill tubes 60, 60a, 60b, 60c, 60d, 60e, 60f from the manifold 62 flows through the fill tubes 60, 60a, 60b, 60c, 60d, 60e, 60f and to the inflation chamber 32 of the airbag 26 and the inflation chambers 58 of the support tubes 34a, 34b, 34c, 34d, 34e, 34f. Each of the fill tubes 60, 60a, 60b, 60c, 60d, 60e, 60f defines an inner diameter. The inner diameters of the fill tubes 60a, 60b, 60c, 60d, 60e, 60f in fluid communication with the support tubes 34a, 34b, 34c, 34d, 34e, 34f may be greater than the inner diameter of each of the fill tubes 60 in fluid communication with the airbag 26. The inner diameter of the fill tube 60a, 60b in fluid communication with the support tube 34a, 34b supported by the seat back 22 at the top end 24 between the first side 44 and the second side 46 may be greater than the inner diameters of the fill tubes 60c, 60d, 60e, 60f in fluid communication with the other support tubes 34c, 34d, 34e, 34f. The varying diameters of the fill tubes 60, 60a, 60b, 60c, 60d, 60e, 60f control fluid flow rates to the airbag 26 and the support tubes 34a, 34b, 34c, 34d, 34e, 34f. For example, the varying diameters permit faster inflation of the support tubes 34a, 34b, 34c, 34d, 34e, 34f than the airbag 26 and/or faster inflation of the support tube supported 34a, 34b by the seat back 22 at the top end 24 between the first side 44 and the second side 46 than the other support tubes 34c, 34d, 34e, 34f.

Figure 6:
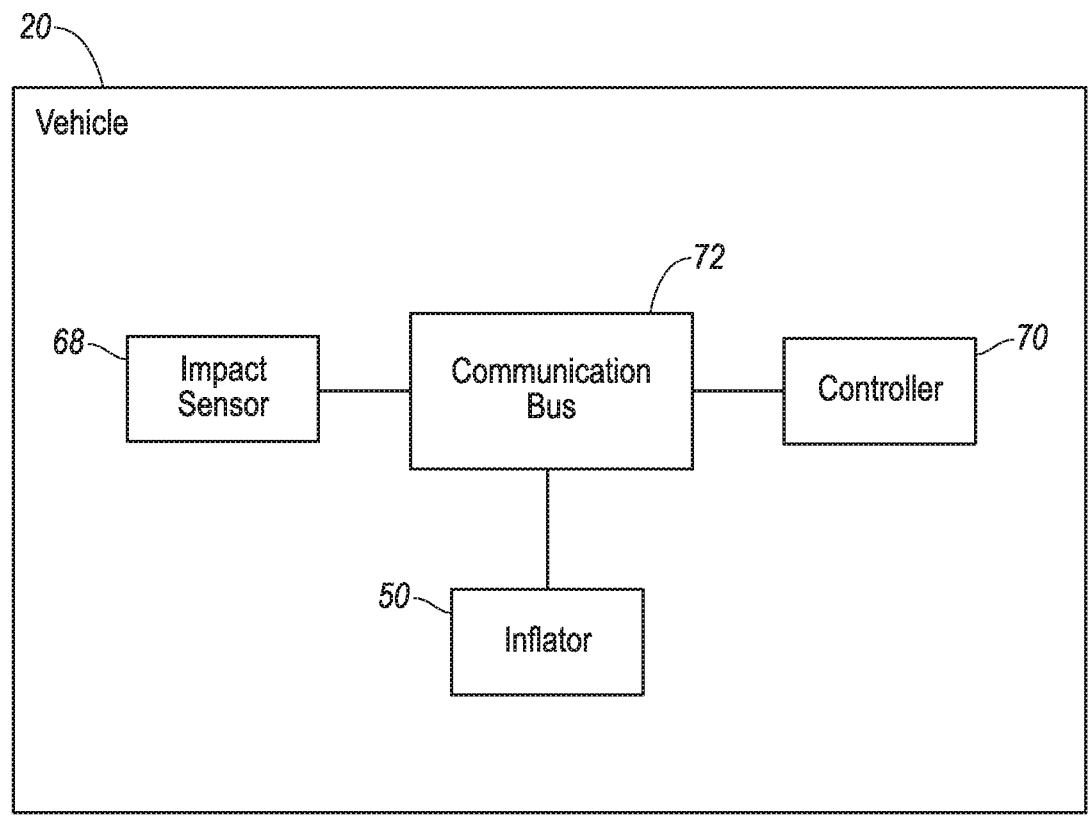
FIG. 6 is a block diagram of components of the vehicle.

With reference to FIG. 6, the vehicle 20 may include an impact sensor 68 programmed to detect an impact to the vehicle 20. The impact sensor 68 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 68 may be located at numerous points in or on the vehicle 20.

The vehicle 20 may include a controller 70 for controlling actuation of the inflator 50. The controller 70 may be a microprocessor-based controller implemented via circuits, chips, or other electronic components. For example, the controller 70 may include a processor, memory, etc. The memory of the controller 70 may include memory for storing instructions executable by the processor for performing the functions described herein, as well as for electronically storing data and/or databases.

The controller 70, the impact sensor 68, and the inflator 50 may be connected to a communication bus 72, such as a controller area network (CAN) bus, of the vehicle 20. The controller 70 may use information from the communication bus 72 to control the activation of the inflator 50. The inflator 50 may be connected to the controller 70 via the communication bus 72 as shown in FIG. 6, or the inflator 50 may be may be connected directly to the controller 70 (now shown).

In operation under normal operating conditions of the vehicle 20, the airbag 26 and the support tubes 34a, 34b, 34c, 34d, 34e, 34f are in the uninflated positions. In the event of an impact, the impact sensor 68 may detect the impact and transmit a signal through the communication bus 72 to the controller 70. The controller 70 may transmit a signal through the communication bus 72 to the inflator 50. The inflator 50 may discharge and inflate the airbag 26 and the support tubes 34a, 34b, 34c, 34d, 34e, 34f. Inflation medium from the inflator 50 may first inflate the support tube 34a, 34b supported by the seat back 22 at the top end 24 between the first side 44 and the second side 46, followed by the other support tubes 34c, 34d, 34e, 34f. Inflation of the support tubes 34a, 34b, 34c, 34d, 34e, 34f may carry the airbag 26 above and around an occupant of the seat 36, and position the airbag 26 relative to the seat 36 and the occupant prior to complete inflation of the airbag 26. The inflation medium may then inflate the airbag 26 to control kinematics of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
    a seat back having a top end;
    an airbag supported by the seat back and inflatable to an inflated position including an inner panel and an outer panel defining an inflation chamber therebetween; and
    a plurality of support tubes inflatable to inflated positions extending from the seat back along the outer panel, at least one of the support tubes in the inflated position extending from the top end of the seat back.

2. The assembly of claim 1, wherein the plurality of support tubes each extend to a distal end, the distal ends fixed to airbag.

3. The assembly of claim 1, further comprising an inflator in fluid communication with the airbag and the plurality of support tubes.

4. The assembly of claim 1, wherein the seat back includes a first side and a second side spaced from the first side along a cross-seat axis, and wherein the plurality of support tubes includes a first support tube supported by the seat back at the top end between the first side and the second side, a second support tube supported by the seat back at the first side, and a third support tube supported by the seat back at the second side.

5. The assembly of claim 4, further comprising a first fill tube in fluid communication with the first support tube, a second fill tube in fluid communication with the second support tube, and a third fill tube in fluid communication with the third support tube.

6. The assembly of claim 5, wherein the first fill tube, the second fill tube, and the third fill tube each define an inner diameter, the inner diameter of the first fill tube being greater than the inner diameters of the second fill tube and the third fill tube.

7. The assembly of claim 4, wherein the airbag in the inflated position includes a front edge, and the first support tube extends from the seat back to a distal end, the distal end of the first support tube fixed to the airbag at the front edge.

8. The assembly of claim 4, wherein the airbag in the inflated position includes an apex, and the first support tube extends from the seat back to a distal end, the distal end of the first support tube fixed to the airbag at the apex.

9. The assembly of claim 1, wherein the airbag in the inflated position includes a rear edge, and further comprising a tether connecting the seat back to the rear edge of the airbag.

10. The assembly of claim 1, wherein at least one of the support tubes of the plurality of support tubes includes fabric that is stronger than a fabric of the airbag.

11. The assembly of claim 1, wherein the airbag in the inflated position is dome shaped.

12. An assembly, comprising:
    a seat back having a top end, and a first side and a second side spaced from the first side along a cross-seat axis;
    an airbag supported by the seat back and inflatable to an inflated position including an inner panel and an outer panel defining an inflation chamber therebetween, the airbag in the inflated position extending along and away from the top end, first side, and the second side of the seat back;
    a plurality of support tubes inflatable to inflated positions extending from the seat back along the outer panel, at least one of the support tubes in the inflated position extending from the top end of the seat back;
    an inflator supported by the seat back; and
    a plurality of fill tubes in fluid communication with inflator and the airbag.

13. The assembly of claim 12, further comprising a manifold between and in fluid communication with the inflator and the fill tubes.

14. The assembly of claim 12, further comprising a second fill tube in fluid communication with the inflator and at least one support tube of the plurality of support tubes.

15. The assembly of claim 14, wherein the second fill tube defines an inner diameter that is greater than an inner diameter of each of the fill tubes of the plurality of the fill tubes in fluid communication with the airbag and the inflator.

16. The assembly of claim 14, wherein the at least one support tube in the inflated position is outside of the airbag in the inflated position.

17. The assembly of claim 12, wherein the airbag in the inflated position is dome shaped.

18. The assembly of claim 12, wherein the inflation chamber is continuous from the first side of the seat back to the second side of the seat back.

19. The assembly of claim 18, wherein at least one support tube of the plurality of support tubes is inflatable to an inflated position defining an inflation chamber that is isolated from the inflation chamber of the airbag.

20. The assembly of claim 12, further comprising a floor, the seat back supported by and rotatable relative to the floor.

* * * * *